(12) United States Patent
Sekine (10) Patent No.: US 6,198,428 B1
(45) Date of Patent: Mar. 6, 2001

(54) THREE-DIMENSIONALLY DESIGNED DISPLAY RADAR

(75) Inventor: Chogo Sekine, Musashimurayama (JP)

(73) Assignee: Japan Radio Co., Ltd., Tokyo (JP)

( * ) Notice: Subject to any disclaimer, the term of this patent is extended or adjusted under 35 U.S.C. 154(b) by 0 days.

(21) Appl. No.: 09/325,829

(22) Filed: Jun. 4, 1999

(30) Foreign Application Priority Data

Jun. 11, 1919 (JP) .................................................. 10-163393
Dec. 8, 1998 (JP) .................................................. 10-348887

(51) Int. Cl.$^7$ .................................. G01S 7/20; G01S 7/22
(52) U.S. Cl. .......................... 342/176; 342/179; 342/180; 342/182; 342/183; 342/185
(58) Field of Search ...................................... 342/176, 178, 342/179, 180, 181, 182, 183, 185, 186, 195, 197

(56) References Cited

U.S. PATENT DOCUMENTS

| | | | |
|---|---|---|---|
| 5,061,935 | * 10/1991 | Sekine et al. | 342/180 |
| 5,339,085 | * 8/1994 | Katoh et al. | 342/180 |
| 5,341,141 | * 8/1994 | Frazier et al. | 342/59 |
| 5,357,258 | 10/1994 | May | 342/185 |

FOREIGN PATENT DOCUMENTS 8-30732   3/1996   (JP) .

* cited by examiner

Primary Examiner—John B. Sotomayor
(74) Attorney, Agent, or Firm—Frishauf, Holtz, Goodman, Langer & Chick, P.C.

(57) ABSTRACT

A three-dimensionally designed display radar in which a two-dimensional image data and three-dimensionally designed image data are depicted in combination in a video memory by the aid of an image controller, and they are simultaneously depicted on a screen of a display unit.

18 Claims, 8 Drawing Sheets

THREE-DIMENSIONALLY DESIGNED DISPLAY RADAR

BACKGROUND OF THE INVENTION

1. Field of the Invention

The present invention relates to a three-dimensionally designed display radar which is carried, for example, on a ship and which preferably detects a target.

2. Description of the Related Art

In recent years, the radar is broadly utilized on a small ship such as a pleasure boat. As well-known in the art, such a radar is operated as follows. That is, a transmission radio wave, which is transmitted from a rotating antenna, is reflected by a target. A reflected radio wave therefrom is received to display a concentric circular image depicted about a center of its own position on a display unit.

In such a system, the intensity of the reflected radio wave is displayed as a difference in brightness of a point at which the target exists, for example, on a screen of the display unit of the raster scan type.

When such a radar is used, it is possible to observe an objective moving ship which approaches a subjective ship during its navigation and anchorage. Further, it is possible to monitor whether or not the subjective ship is deviated from an anchorage position, for example, due to a tide, on the basis of the reflected radio wave from a fixed reflecting object.

In general, when such a display unit equipped for the ship radar is operated, the target point on a screen is displayed in a two-dimensionally designed manner as in a plan view, in which the image is not displayed such that the target is displayed based on information on the height on the screen.

Therefore, for example, when the radar is carried on the pleasure boat or the like, it is difficult for a user who is not familiar with the radar observation so much to effectively perform the recognition and the observation of surrounding circumstances and the detection of the target on the basis of the displayed image. A problem arises in that the carried radar is hardly utilized in an effective manner.

In order to solve this problem, the present applicant has proposed a radar apparatus which enables a user who is not accustomed to the radar observation so much, for example, to effectively detect the target by three-dimensionally displaying the target on the screen of the display unit. Details of the three-dimensionally designed display radar are disclosed in Japanese Patent Publication No. 8-30732.

The three-dimensionally designed display radar comprises a radar transmitting/receiving unit for deriving, from a target, signals concerning the orientation information, the distance information, and the reception intensity information; a display unit; a three-dimensionally designed coordinate converter for making conversion into a signal to indicate the orientation information and the distance information as XY coordinate values based on the perspective projection drawing method added with the reception intensity information to indicate a length of a straight line as a height of the target; a marker-generating means for sending a lattice-shaped distance marker signal when three-dimensionally designed display is made on a screen of the display unit; and a storage means provided with storage addresses corresponding to respective picture elements on the display unit, for storing the reception intensity information in the storage address corresponding to the XY coordinate obtained by the three-dimensionally designed coordinate converter and storing the marker signal when the three-dimensionally designed display is made so that the stored information and the stored marker signal are successively read to send an image signal to the display unit.

The three-dimensionally designed display radar concerning the conventional technique enables an observer who is not accustomed to the radar observation so much to perform the detection or the like by three-dimensionally displaying the target on the display radar.

However, the conventional three-dimensionally designed display radar is constructed such that the two-dimensional display and the three-dimensionally designed display are switched to be selectively used. Therefore, at first, when the two-dimensional display screen is switched to the three-dimensionally designed display screen, or when the three-dimensionally designed display screen is inversely switched to the two-dimensional display screen, a certain period of time is required to allow the antenna to make one revolution. That is, in the case of an ordinary radar, a period of time of about 2.5 to 3 seconds is required. During this period, the user, for example, a navigator has to wait for the period of time.

Secondly, a certain term is required until a navigator, who is accustomed to the two-dimensional display screen, is accustomed to the three-dimensionally designed display screen. During the term until the navigator is accustomed, it is preferable that the two-dimensional display and the three-dimensionally designed display can be simultaneously used in combination. However, such an operation cannot be performed when the conventional three-dimensionally designed display radar is used.

Further, the conventional three-dimensionally designed display radar is constructed such that the lattice-shaped distance marker indication is superimposed on the display unit. However, when the radar is used during the navigation through a river or an inlet, the surrounding targets themselves have their shapes which are easily observable three-dimensionally in many cases. If the distance marker is displayed on the screen in the superimposed manner when the three-dimensionally designed image data is displayed, then the display is inversely complicated, and it is difficult to observe the image of the objective target in some cases.

Furthermore, the three-dimensionally designed display radar described above is constructed such that the three-dimensionally designed display is made on the basis of only a point of sight in a certain fixed direction. Therefore, the three-dimensionally designed display radar fails to satisfy the demand that the three-dimensionally designed display is intended to be made on the basis of a point of sight at an arbitrary angle.

SUMMARY OF THE INVENTION

The present invention has been made taking the foregoing problem into consideration, an object of which is to provide a three-dimensionally designed display radar which makes it unnecessary to provide the display-switching time for the three-dimensionally designed display and the two-dimensional display.

Another object of the present invention is to provide a three-dimensionally designed display radar which makes it possible to selectively display the distance marker.

Still another object of the present invention is to provide a three-dimensionally designed display radar which makes it possible to perform the three-dimensionally designed display on the basis of an arbitrary point of sight.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

The three-dimensionally designed display radar according to the present invention will be explained in detail below as exemplified by preferred embodiments with reference to the accompanying drawings.

Figure 1:
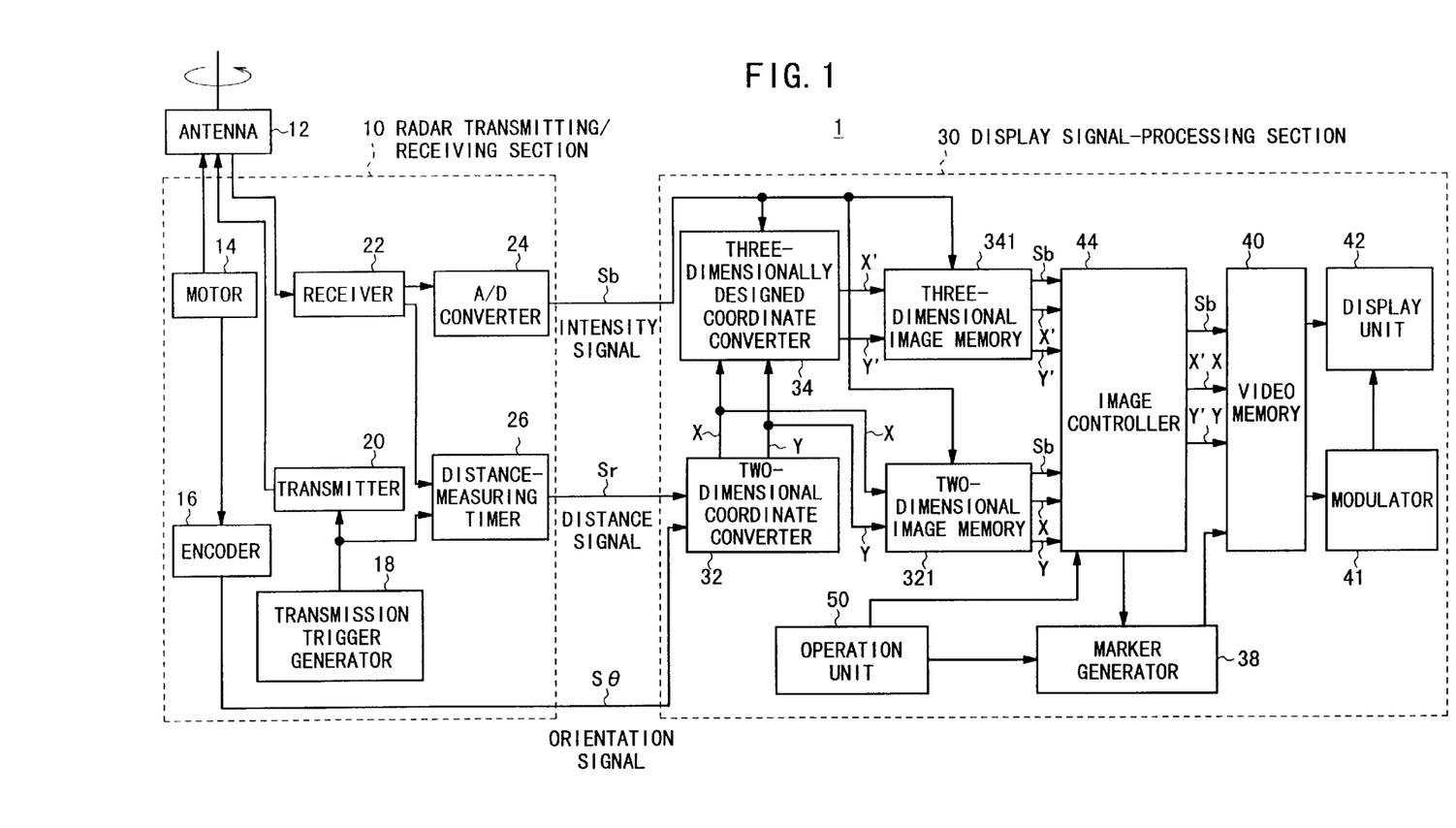
FIG. 1 shows a block diagram illustrating an embodiment of the three-dimensionally designed display radar according to the present invention.

FIG. 1 shows a block diagram illustrating an embodiment of the three-dimensionally designed display radar according to the present invention. The three-dimensionally designed display radar 1 concerning this embodiment basically comprises a radar transmitting/receiving section 10 including an antenna 12, and a display signal-processing section 30 connected thereto.

The radar transmitting/receiving section 10 includes a motor 14 for rotating the antenna 12, an encoder 16 coupled to a rotary shaft of the motor 14, a transmission trigger generator 18, a transmitter 20 for transmitting a transmission signal at a predetermined frequency from the antenna 12, a receiver 22 connected to the antenna 12 for receiving the reflected radio wave from a target, an A/D converter 24 for digitizing the output signal of the receiver 22, and a distance-measuring timer 26 connected to the transmission trigger generator 18.

On the other hand, the display signal-processing section 30 includes a two-dimensional coordinate converter 32, a three-dimensionally designed coordinate converter 34, a two-dimensional image memory 321, a three-dimensional image memory 341, a marker generator 38 capable of performing ON/OFF operation, an image controller 44, a video memory (storage means) 40 as a display memory, a modulator (color modulator, turbidity modulator, brightness modulator) 41, a display unit 42 based on the raster scan system, and an operation-instructing unit (simply referred to as "operation unit" as well) 50.

Next, explanation will be made for the operation of the three-dimensionally designed display radar according to the present invention constructed as described above.

The antenna 12, which is associated with the radar transmitting/receiving section 10, is subjected to rotary driving in the horizontal plane effected by the motor 14. An orientation signal Sθ, which indicates the orientation information (angle θ) of the antenna 12 with respect to a moving object, for example, a bow of a ship, is outputted from the encoder 16, and it is inputted into one input terminal of the two-dimensional coordinate converter 32 of the display signal-processing section 30.

A transmission trigger, which is outputted from the transmission trigger generator 18, is inputted into the transmitter 20. The transmission trigger allows the transmission pulse oscillated by an oscillator such as a magnetron to be radiated from the transmitter 20 via the antenna 12.

The transmission pulse signal, which is radiated from the antenna 12, is reflected by an unillustrated target. A reflected radio wave from the target is received via the antenna 12 by the receiver 22. An intensity signal Sb, which indicates the amplitude value of the reception signal outputted from the receiver 22, i.e., the reception intensity information of the reflected radio wave, is converted by the A/D converter 24 into a digital signal which is inputted into the three-dimensionally designed coordinate converter 34 of the display signal-processing section 30.

The transmission trigger output of the transmission trigger generator 18 is also supplied to the distance-measuring timer 26. The elapsed time, which is required from the point of time of the supply of the trigger signal to the reception of the reflected radio wave by the receiver 22, is measured by the distance-measuring timer 26. The half of a product of the elapsed time and the transmission velocity of the transmitted radio wave, i.e., the information on the distance to the target is converted into a digital signal which is used as a distance signal Sr to be sent to the other input terminal of the two-dimensional coordinate converter 32. The operation for measuring the distance effected by the distance-measuring timer 26 is completed by the detection of the passage of time which indicates the maximum measurement distance previously set by using, for example, an unillustrated switch.

The intensity signal Sb will now be explained. The directivity of the antenna 12 of the ordinary ship radar is usually set such that the beam width in the horizontal direction is about 2 degrees, and the beam width in the vertical direction is about 25 degrees in many cases. Therefore, a band-shaped beam is provided, in which the cross section is narrow in the horizontal direction and it is wide in the vertical direction.

Accordingly, when the target located at a short distance is detected, the reflected radio wave from a target having a wide horizontal width and a high height has a large degree of reflection because of its large reflection area, as compared with the reflected radio wave from a target having a wide horizontal width and a low height, provided that the targets have the same physical property. Therefore, the three-dimensionally designed image display can be made by performing the signal processing on the basis of the difference in reception signal level as described later on.

The orientation signal Sθ, the intensity signal (reception intensity signal) Sb, and the distance signal Sr, which are obtained by the radar transmitting/receiving section 10 as described above, are supplied to the display signal-processing section 30.

In this embodiment, the orientation signal SO and the distance signal Sr are inputted into the two-dimensional coordinate converter 32. The position of the polar coordinate (R, θ) of the target, which is represented by the polar coordinate system, is converted into the output signal which indicates the XY coordinate values (X, Y) on the screen of the display unit 42 based on the raster scan system. This operation will be explained with reference to FIG. 3.

Figure 3:
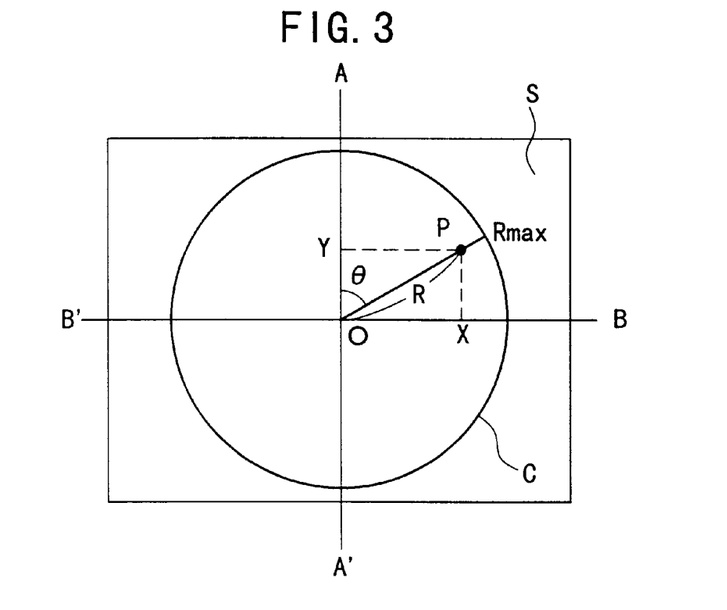
FIG. 3 is used to explain the operation of the two-dimensional coordinate conversion concerning the embodiments shown in FIGS. 1 and 2.

The reference symbol S in FIG. 3 indicates the display screen of the display unit 42 based on the two-dimensional coordinate converter 32 which adopts the raster scan system. The reference symbol C indicates a circle having a radius Rmax which represents the measurement distance range of the radar. The line segment BB' indicates the X axis which passes through the center O of the display screen S, the line segment AA' indicates the Y axis which passes through the center O of the display screen S, and the center O indicates the position of the subjective ship.

When the antenna 12 radiates the radio wave from the subjective ship position in a direction of rotation of an angle θ with respect to the bow orientation (direction A along the line segment AA'), the radio wave proceeds from the center O toward the radius Rmax. The two-dimensional coordinate converter 32 calculates the X coordinate value and the Y coordinate value of each of the picture elements disposed along the line segment ORmax. For example, the values of the X coordinate and the Y coordinate of the picture element having the polar coordinate P (R, θ) of the target P are represented by X=R sin θ and Y=R cos θ respectively.

The output signal, i.e., the coordinate P (X, Y), which represents the values of the X coordinate and the Y coordinate of the picture element on the display screen S calculated by the two-dimensional coordinate converter 32 as described above, is supplied as a memory address to the two-dimensional image memory 321. The intensity signal Sb is stored in a memory cell corresponding to the coordinate P (X, Y). The coordinate P (X, Y) is inputted into the three-dimensionally designed coordinate converter 34.

The three-dimensionally designed coordinate converter 34 performs the calculation to express the three-dimensionally designed information on the two-dimensional screen in an imitated manner. In this embodiment, at first, the intensity signal Sb, which represents the reception intensity of the reflected radio wave obtained by the radar transmitting/receiving section 10, is added to the two-dimensional coordinate P (X, Y) of the target P. Thus, the three-dimensionally designed coordinate Q (X', Y'), which is used to obtain the three-dimensionally designed display on the two-dimensional coordinate, is obtained. The three-dimensionally designed coordinate Q (X', Y'), which is obtained by the three-dimensionally designed coordinate converter 34, is supplied to the three-dimensional image memory 341. The intensity signal Sb is stored in the memory cell corresponding to the three-dimensionally designed coordinate Q (X', Y').

Figure 4:
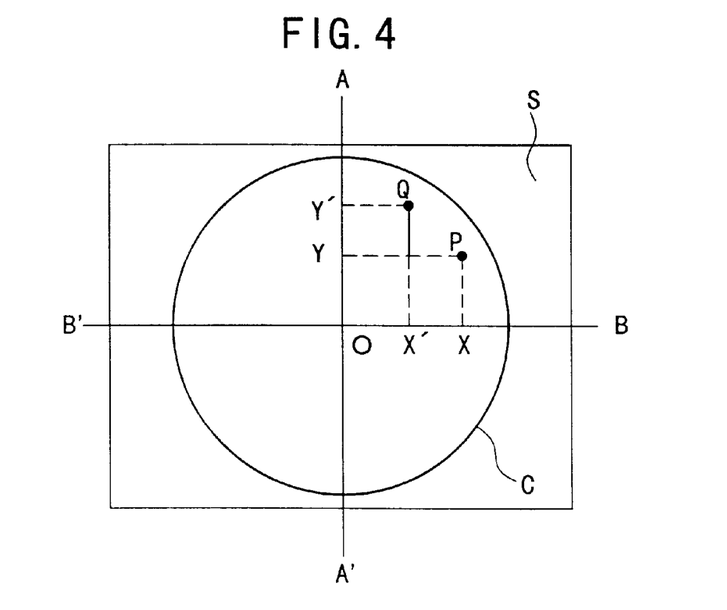
FIG. 4 is used to explain the operation of the three-dimensionally designed coordinate conversion concerning the embodiments shown in FIGS. 1 and 2.

The operation of the three-dimensionally designed coordinate converter 34 will now be explained with reference to FIG. 4. It is assumed that the two-dimensional coordinate of the picture element of the target on the display screen S is P (X, Y), and the reception intensity (level of the intensity signal Sb) of the reflected radio wave from the target is represented by SB (Sb=SB). Based on them, the three-dimensionally designed coordinate converter 34 obtains the three-dimensionally designed coordinate Q (X', Y') in accordance with the perspective projection drawing method. In this process, the X coordinate X' as the coordinate of the picture element on the display screen S is represented as follows.

$$X' = X - K_r \times Y \text{ (if } X \geq 0 \text{ is given)} \quad (1)$$
$$= X + K_r \times Y \text{ (if } X < 0 \text{ is given)}$$

wherein $K_r$ is a suitably selected positive constant.

On the other hand, the Y coordinate Y' is represented as follows, to make indication by using a straight line extending over a range of Y to Y'.

$$Y'=Y+K_r SB \quad (2)$$

wherein $K_r$ is a suitably selected positive constant.

That is, the coordinate P (X, Y) of the target P on the two-dimensional coordinate can be displayed with the depth perception in conformity with the position in front of or at the back of the subjective ship on the three-dimensional coordinate such that the target P is expressed to make approach to the Y axis at the position in front of the subjective ship (Y≧0), and the target P is expressed to make separation from the Y axis at the back of the subjective ship (Y<0). The point of the target P on the two-dimensional coordinate is displayed on the three-dimensionally designed coordinate such that the point is expanded in the vertical direction in response to the reception intensity SB (level of the intensity signal Sb) of the reflected radio wave from the target P. Therefore, even if the height is the same, a target P located at a short distance is expressed by a long straight line, while a target P located at a long distance is expressed by a short straight line. Thus, the target P is displayed with the three-dimensional effect. Accordingly, the display is easily viewed and recognized by a user who is not accustomed to the operation of the radar.

The three-dimensionally designed coordinate Q (X', Y'), which is calculated by the three-dimensionally designed coordinate converter 34, is outputted to the three-dimensional image memory 341. The reception intensity SB (level of the intensity signal Sb) of the reflected radio wave from the target P is stored in each memory cell of the storage address (X', Y to Y') as the corresponding memory address. The operation described above is repeated for a period in which the antenna 12 makes one revolution, i.e., until the image corresponding to one screen is completed on the display unit 42. There is no trouble even when the reception intensity SB (level of the intensity signal Sb) of the reflected radio wave from the target P to be stored is a previously determined constant value.

The two-dimensional coordinate P (X, Y), which is calculated by the two-dimensional coordinate converter 32 described above, is outputted to the two-dimensional image memory 321 simultaneously with the operation described above. The reception intensity SB (level of the intensity signal Sb) of the reflected radio wave from the target P is stored in the memory cell of the corresponding storage address (X, Y). The operation described above is repeated for a period in which the antenna 12 makes one revolution, i.e., until the image corresponding to one screen is completed on the display unit 42, in the same manner as for the three-dimensionally designed information described above.

As described above, the latest two-dimensional image and the latest three-dimensionally designed image corresponding to one screen are stored in the two-dimensional image memory 321 and the three-dimensional image memory 341 respectively. The two pieces of image information are stored (depicted) in the video memory 40 as the display memory via the image controller 44.

The image controller 44 processes the image data, and it performs the control operation so as to store, in the video memory 40, any one of or both of the two pieces of storage data selected and designated by the user or the navigator as an operator for the radar by the aid of the operation unit 50, i.e., the image data in the two-dimensional image memory 321 and the image data in the three-dimensional image memory 341.

On the other hand, the marker generator 38 is provided to generate the coordinates of the picture elements of the distance markers to be written into the video memory 40 on the basis of the instruction from the operation unit 50. When the distance markers are superimposed on the two-dimensional image, for example, the marker generator 38 generates a picture element signal (concentric distance marker) for coordinates corresponding to concentric circles disposed at intervals of radius of 1 mile from the subjective ship position (center O) as indicated by symbols M11, M12, M13 in FIG. 5. When the distance markers are superimposed on the three-dimensionally designed image, for example, the marker generator 38 generates a picture element signal (lattice-shaped distance marker based on the perspective projection) for coordinates corresponding to lattices disposed vertically and horizontally at intervals of 1 mile from the subjective ship position (center O) as indicated by symbols M21, M22, M23 in FIG. 6.

The output of the marker generator 38 is superimposed on the concerning two-dimensional image data and the three-dimensionally designed image data to be stored in the video memory 40 by making selection and designation by operating, for example, a predetermined switch of the operation unit 50 by the user or the navigator as the radar operator by the aid of the image controller 44, in the same manner as for the data of the two-dimensional image and the three-dimensionally designed image described above. Thus, it is possible to display, on the display unit 42, the image concerning the two-dimensional image data (referred to as "two-dimensional image" or "two-dimensional display image") and the image concerning the three-dimensionally designed image data (referred to as "three-dimensionally designed image" or "three-dimensionally designed display image") superimposed with the markers.

As described above, according to the three-dimensionally designed display radar concerning the present invention, the following operation can be performed by operating the operation unit 50 by the navigator as the radar operator. That is, the image controller 44 is used to store, in the video memory 40, any one of or both of the image data in the two-dimensional image memory 321 and the image data in the three-dimensional image memory 341. Any one of the image concerning the two-dimensional image data and the image concerning the three-dimensionally designed image data can be selectively displayed on the display unit 42. Alternatively, both of the image concerning the two-dimensional image data and the image concerning the three-dimensionally designed image data can be simultaneously depicted in combination on the display unit 42.

Figure 5:
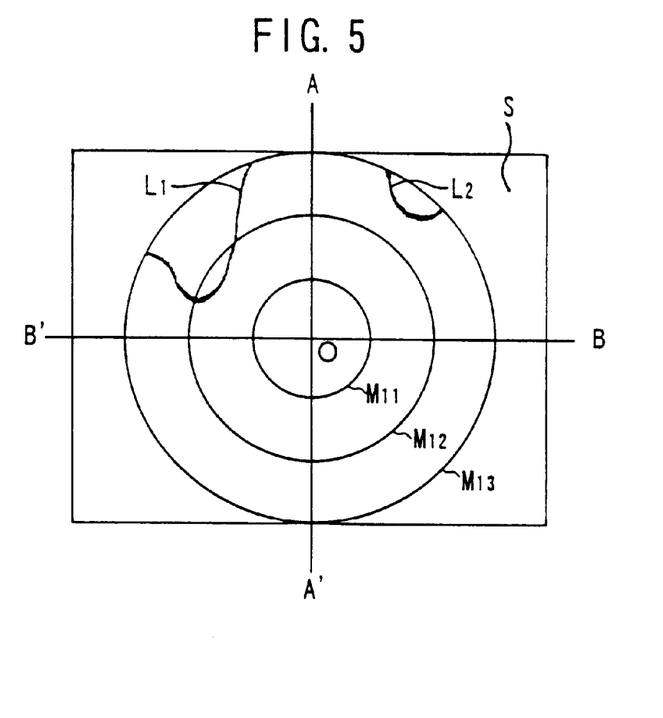
FIG. 5 shows a two-dimensional display image concerning the embodiments shown in FIGS. 1 and 2.
Figure 6:
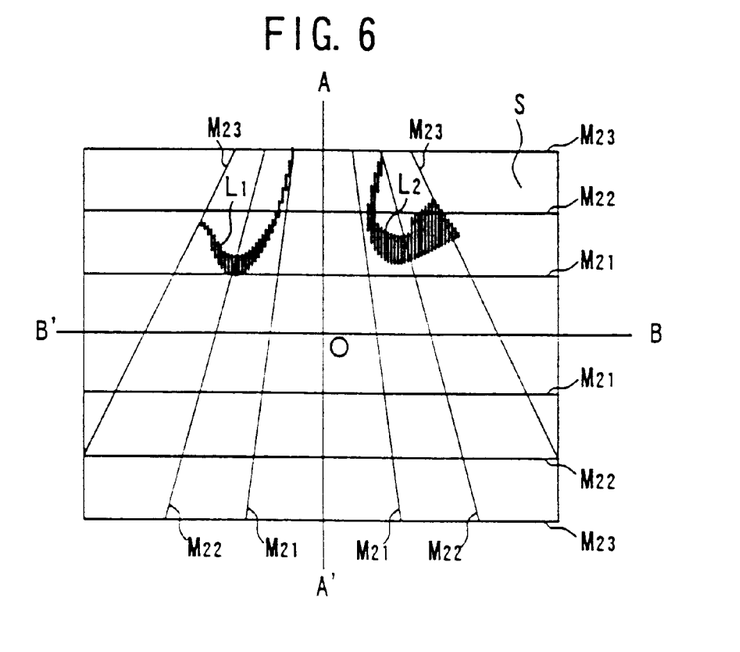
FIG. 6 shows a three-dimensionally designed display image concerning the embodiments shown in FIGS. 1 and 2.

When the two-dimensional image data is selected, the land contours of land images L1, L2 are displayed linearly on the display screen S of the display unit 42 in the same manner as in the conventional technique as shown in FIG. 5. The portion having a larger reception intensity SB (level of the intensity signal Sb) is displayed with a higher brightness thereof. When the three-dimensionally designed image data is selected, the land contours of land images L1, L2 are displayed by using lengths of height images (in the Y direction) corresponding to the magnitude of the reception intensity SB (level of the intensity signal Sb) of the reflected radio wave on the display screen S of the display unit 42 as shown in FIG. 6. Thus, the image is displayed with the depth perception and the three-dimensional effect.

Figure 7:
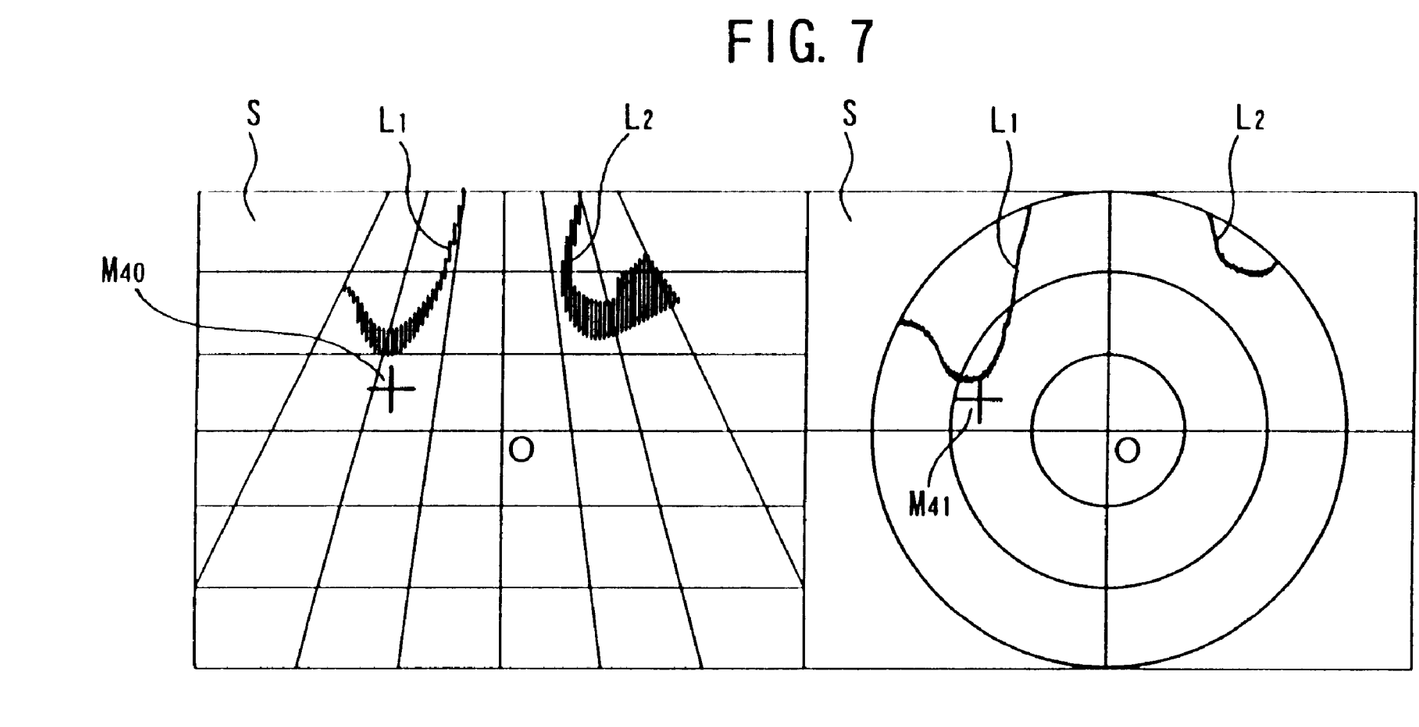
FIG. 7 shows an example in which the two-dimensional display image and the three-dimensionally designed display image concerning the embodiments shown in FIGS. 1 and 2 are simultaneously depicted in combination.

When both of the two-dimensional image data and the three-dimensionally designed image data are selected, the two-dimensional image and the three-dimensionally designed image as shown in FIGS. 5 and 6 are simultaneously depicted in combination on the display screen S of the display unit 42 as shown in FIG. 7. The navigator as the radar operator can simultaneously observe the both images.

FIGS. 5 and 6 are illustrative of the cases in which the markers for indicating the distance outputted by the marker generator 38 are superimposed on the two-dimensional image and the three-dimensionally designed image respectively to be displayed on the display screen S of the display unit 42.

In the exemplary display shown in FIG. 6 and the exemplary display shown in FIG. 7, the perspective projection-based lattice-shaped distance markers (M21, M22, M23), which are obtained by converting the rectangular lattice-shaped distance marker signals into the XY coordinate values based on the perspective projection drawing method, are superimposed on the three-dimensionally designed image to make display on the display screen S of the display unit 42. However, there is no limitation thereto. Another arrangement may be available. That is, as indicated by symbols M31, M32, M33 in FIG. 8, the substantially egg-shaped distance marker signals, which are obtained by converting the concentric circular distance marker signals into the XY coordinate values based on the perspective projection drawing method, are supplied from the marker generator 38 to the video memory 40. The substantially egg-shaped distance markers (M31, M32, M33) are superimposed on the land images L1, L2 which are three-dimensionally designed images to make display on the display screen S of the display unit 42.

Figure 8:
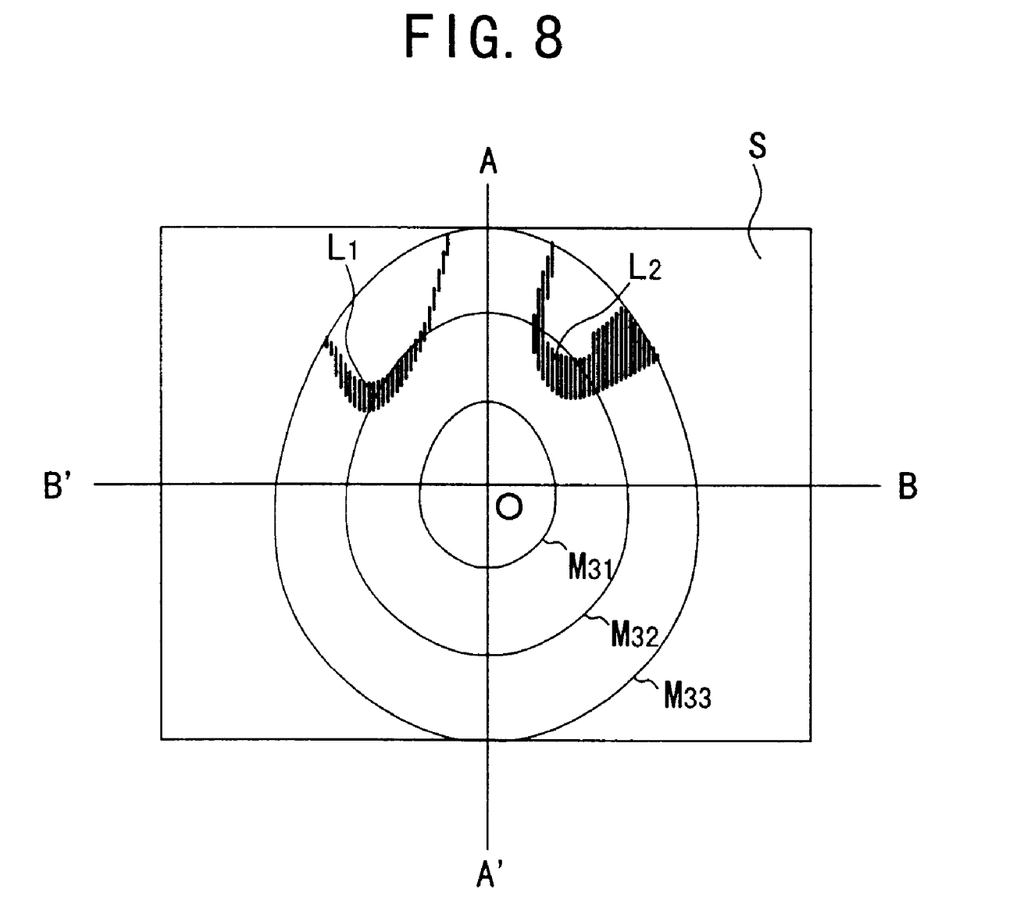
FIG. 8 shows another exemplary three-dimensionally designed display image concerning the embodiments shown in FIGS. 1 and 2.

The substantially egg-shaped distance markers (M31, M32, M33) can be also subjected to ON/OFF display (which can be displayed or not displayed) in accordance with the control made by the image controller 44 on the basis of the operation performed by the operator by using the operation unit 50.

Figure 9:
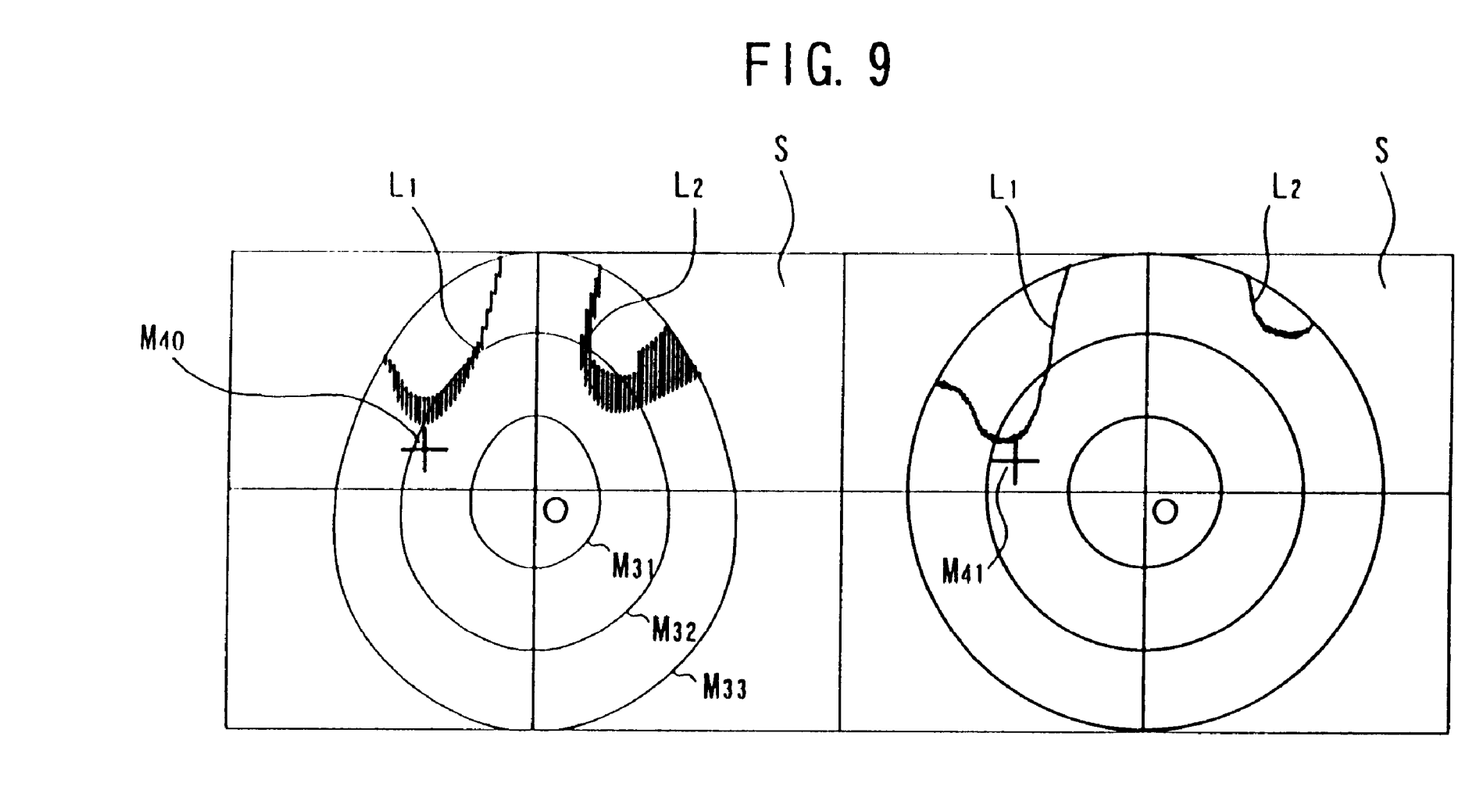
FIG. 9 shows another example in which the two-dimensional display image and the three-dimensionally designed display image concerning the embodiments shown in FIGS. 1 and 2 are simultaneously depicted in combination.

Also in this case, as shown in FIG. 9, the three-dimensionally designed display image and the two-dimensional display image can be simultaneously depicted in combination on the display screen S of the display unit 42 on the basis of the operation performed by using the operation unit 50.

The following procedure is available for the display on the display screen S of the display unit 42 concerning the examples shown in FIGS. 5 to 9. That is, the reception intensity SB (level of the intensity signal Sb), which is stored in the video memory 40 corresponding to the coordinate (X, Y) of the picture element of the display unit 42, is read to make display while making modulation with the modulator 41 for the brightness, the turbidity, or the color of the image (signal) to be displayed on the coordinate (X, Y) of the picture element of the display unit 42 corresponding to the magnitude (amplitude) of the reception intensity SB.

In other words, in the exemplary displays shown in FIGS. 5 to 9, it is possible to change the brightness, the turbidity, or the color of the land images L1, L2 in response to the magnitude of the reception intensity SB.

Figure 10:
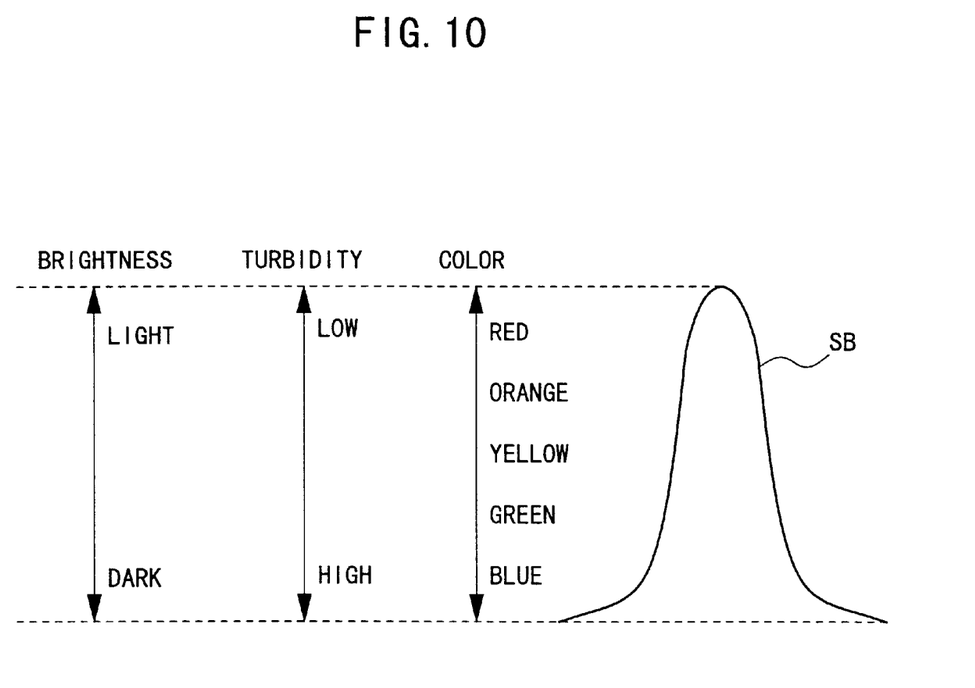
FIG. 10 is used to explain the relationship between the reception intensity and the display brightness, the turbidity, and the color.

Specifically, for example, the reception intensity SB of the reflected radio wave obtained from a single target provides a pulse-shaped reception intensity SB as shown in FIG. 10. The brightness is changed such that it is light where the reception intensity SB is large, and it is dark as the reception intensity SB becomes small. The turbidity is changed such that the purity is high (the turbidity is low) where the reception intensity SB is large, and the purity is low (the turbidity is high) as the reception intensity SB becomes small. The color is gradually changed from red to orange, yellow, green, and blue so that the wavelength gradually becomes short from the portion at which the reception intensity SB is large to the proximal portion.

As described above, when the display is made while modulating the brightness, the turbidity, or the color, it is possible to further enhance the visual recognition of the target. When the brightness modulation display, the turbidity modulation display, or the color modulation display is performed, a logarithmic amplifier is used for the receiver 22 for receiving the reflected radio wave from the target. Thus, it is possible to increase the dynamic range, making it possible to provide more effective display.

Figure 2:
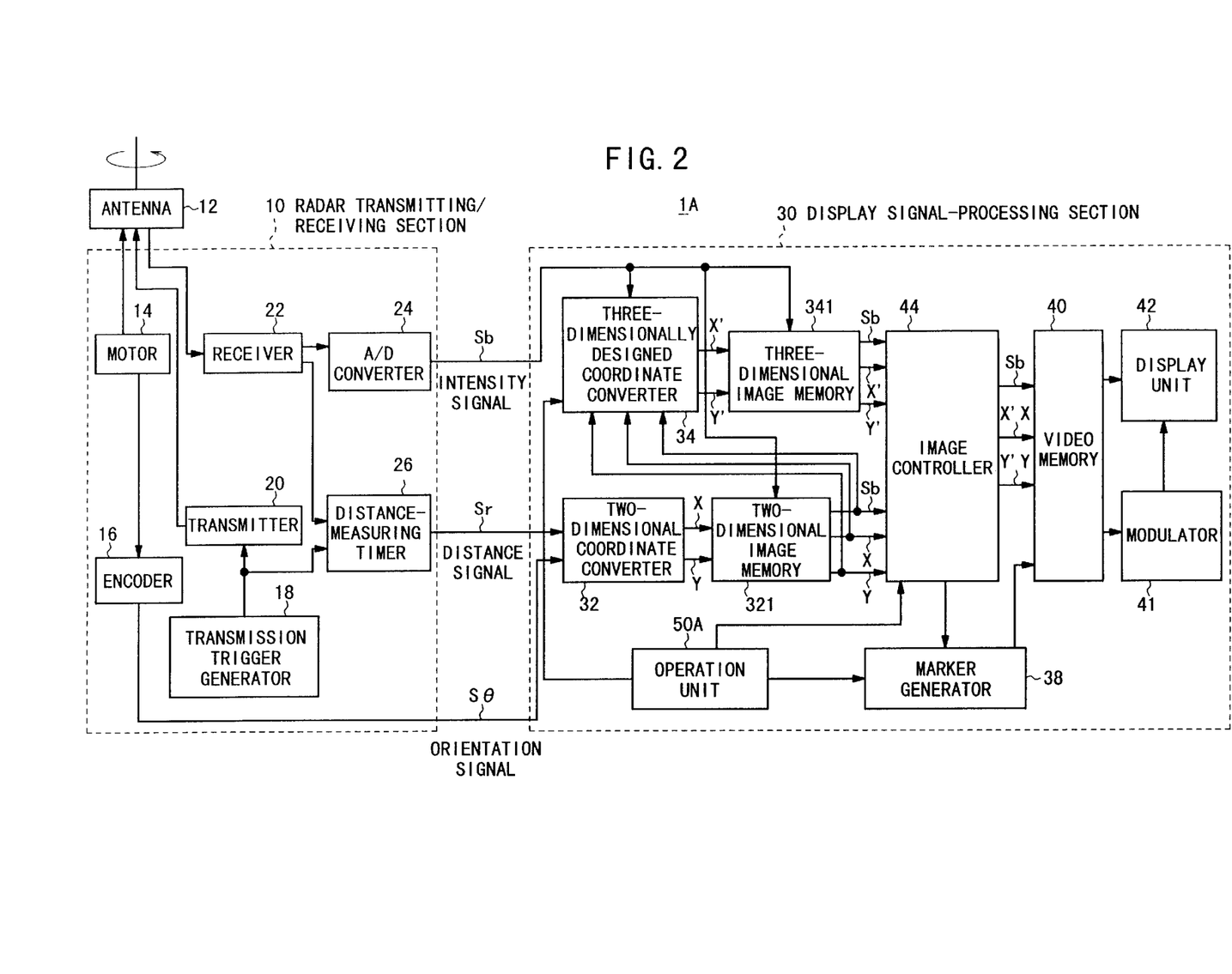
FIG. 2 shows a block diagram illustrating another embodiment of the three-dimensionally designed display radar according to the present invention.

FIG. 2 shows a block diagram illustrating a three-dimensionally designed display radar 1A according to another embodiment of the present invention. The respective constitutive components shown in FIG. 2 and the functions thereof are basically the same as the respective constitutive components shown in FIG. 1. Those corresponding to thereto are designated by the same reference numerals.

The three-dimensionally designed display radar 1A shown in FIG. 2 is different from the three-dimensionally designed display radar 1 shown in FIG. 1 in that the reception intensity SB and the output coordinate (X, Y) of the two-dimensional coordinate converter 32 inputted into the three-dimensionally designed coordinate converter 34 are supplied from the output of the two-dimensional image memory 321. Even such an arrangement makes it possible to essentially perform the same operation as that performed by the three-dimensionally designed display radar 1 shown in FIG. 1.

This embodiment is arranged such that the three-dimensionally designed coordinate converter 34 is connected to the operation unit 50A, and the desired rotation conversion operation is performed in addition to the three-dimensionally designed coordinate conversion operation, on the basis of the operation performed by using the operation unit 50A. By doing so, the target can be observed at a desired angle on the basis of the image data outputted from the two-dimensional image memory 321. Thus, it is possible to provide the three-dimensionally designed display radar 1A which is more useful.

When the three-dimensionally designed display is always displayed as an ordinary display form, the following arrangement is available. That is, the three-dimensional image memory 341 is omitted, and the image data of the three-dimensionally designed coordinate converter 34 is directly stored in the video memory 40 via the image controller 44.

The three-dimensionally designed display radars 1, 1A shown in FIGS. 1 and 2 may be arranged such that, for example, a cross-shaped marker is generated from the marker generator 38. The cross-shaped marker M40, M41 enables the navigator as the radar operator to designate an arbitrary point on the display screen S of the display unit 42 by means of an input means such as a track ball or a joystick arranged for the operation unit 50. As shown in FIG. 7, when a specified position on the three-dimensionally designed display screen S is pointed, then the cross-shaped marker M40 is displayed on the three-dimensionally designed display screen S in conjunction with the pointed position, and the cross-shaped marker M41 is also displayed at the corresponding position on the two-dimensional display screen S. As described above, the cross-shaped markers M40, M41 are displayed at the corresponding positions on both of the three-dimensionally designed display screen S and the two-dimensional display screen S which are simultaneously depicted in combination. Thus, the specified positions on the screens are allowed to correctly correspond to one another. The cross-shaped markers M40, M41 can be displayed as a plurality of individuals on the both display screens S respectively, or they can be displayed as other marks such as asterisks.

Further, it is possible to provide the three-dimensionally designed display radars 1, 1A which are more convenient, by making the arrangement such that the orientation and the distance from the subjective ship position (center O) to the cross-shaped markers M40, M41 are displayed, for example, by using numerical values. Further, if necessary, it is possible to omit the display of the lattice-shaped distance markers in the three-dimensionally designed display and the display of the substantially egg-shaped distance markers on the basis of the operation effected by using the operation units 50, 50A so that the image may be easily observed.

As described above, according to the three-dimensionally designed display radar concerning the present invention, the following effect is achieved. That is, the concentric circular two-dimensional display and the three-dimensionally designed display for indicating the height of the detected target by using the length (in the Y direction) of the display image can be selectively depicted, or both of the images can be simultaneously depicted in combination, on the basis of the information on the orientation, the distance, and the reception intensity which are obtained in accordance with the process for the received signal as performed by the well-known radar.

Accordingly, the three-dimensionally designed display radar concerning the present invention is advantageous in that the image of the target provided with the depth perception and the three-dimensional effect is formed, making it possible to effectively observe the screen, and especially recognize the condition of the target. Further, it is possible to simultaneously depict both of the two-dimensional display image and the three-dimensionally designed display image in combination. Thus, an effect is obtained in that no time is required to switch the display.

The following effects are also obtained. That is, the distance marker can be selectively displayed, and the three-dimensionally designed display can be made from an arbitrary point of sight.

What is claimed is:

1. A three-dimensionally designed display radar comprising:
    a radar transmitting/receiving section for deriving an orientation signal, a distance signal, and a reception intensity signal concerning a target respectively;
    a display unit;
    a display memory provided with a memory cell corresponding to each of picture elements on said display unit, for reading image data stored in said memory cell to supply it to said display unit;

a two-dimensional coordinate converter for converting said orientation signal and said distance signal into XY coordinate values to be used for two-dimensional screen display;

a two-dimensional image memory for storing said reception intensity signal as two-dimensional image data in said memory cell designated by said XY coordinate values;

a three-dimensionally designed coordinate converter for converting said orientation signal and said distance signal into XY coordinate values based on a perspective projection drawing method, and converting said reception intensity signal into a signal for indicating a height of said target with a length of a straight line; and an image controller for selectively outputting, to said display memory, one of or both of said two-dimensional image data outputted from said two-dimensional image memory and three-dimensionally designed image data outputted from said three-dimensionally designed coordinate converter on the basis of an instruction of an operator, wherein:

any one of or both of a two-dimensional image concerning said two-dimensional image data and a three-dimensionally designed image concerning said three-dimensionally designed image data are displayed on said display unit on the basis of control made by said image controller.

2. The three-dimensionally designed display radar according to claim 1, further comprising:

a modulator, wherein:

said modulator is supplied with said signal for indicating said reception intensity signal as said height of said target with said length of said straight line, as data of said three-dimensionally designed image data from said display memory, and a signal for changing brightness, turbidity, or color corresponding to magnitude of said signal for making indication with said length of said straight line is supplied to said display unit so that said brightness, said turbidity, or said color is changed and displayed on said display unit depending on heights of individual portions of said target.

3. The three-dimensionally designed display radar according to claim 1, further comprising:

a marker generator, wherein:

said marker generator converts rectangular lattice-shaped distance marker signals into XY coordinate values based on said perspective projection drawing method to obtain perspective projection-based lattice-shaped distance marker signals which are supplied to said display memory when said three-dimensionally designed image is displayed on a screen of said display unit.

4. The three-dimensionally designed display radar according to claim 3, wherein said perspective projection-based lattice-shaped distance marker signals supplied from said marker generator are selectively superimposed on said three-dimensionally designed image data on the basis of an instruction of said operator.

5. The three-dimensionally designed display radar according to claim 1, further comprising:

a marker generator, wherein:

said marker generator supplies concentric circular distance marker signals to said display memory when said two-dimensional image is displayed on a screen of said display unit.

6. The three-dimensionally designed display radar according to claim 5, wherein said concentric circular distance marker signals supplied from said marker generator are selectively superimposed on said two-dimensional image data on the basis of an instruction of said operator.

7. The three-dimensionally designed display radar according to claim 1, further comprising:

a marker generator, wherein:

said marker generator converts concentric circular distance marker signals into XY coordinate values based on said perspective projection drawing method to obtain substantially egg-shaped distance marker signals which are supplied to said display memory when said three-dimensionally designed image is displayed on a screen of said display unit.

8. The three-dimensionally designed display radar according to claim 7, wherein said substantially egg-shaped distance marker signals supplied from said marker generator are selectively superimposed on said three-dimensionally designed image data on the basis of an instruction of said operator.

9. The three-dimensionally designed display radar according to claim 3, wherein said marker generator further generates a cross-shaped marker at a designated position on said screen of said display unit on the basis of an instruction of said operator.

10. The three-dimensionally designed display radar according to claim 5, wherein said marker generator further generates a cross-shaped marker at a designated position on said screen of said display unit on the basis of an instruction of said operator.

11. The three-dimensionally designed display radar according to claim 7, wherein said marker generator further generates a cross-shaped marker at a designated position on said screen of said display unit on the basis of an instruction of said operator.

12. The three-dimensionally designed display radar according to claim 9, wherein said cross-shaped markers are displayed at said designated positions corresponding to one another on said two-dimensional display image and said three-dimensionally designed display image displayed on said display unit respectively.

13. The three-dimensionally designed display radar according to claim 10, wherein said cross-shaped markers are displayed at said designated positions corresponding to one another on said two-dimensional display image and said three-dimensionally designed display image displayed on said display unit respectively.

14. The three-dimensionally designed display radar according to claim 11, wherein said cross-shaped markers are displayed at said designated positions corresponding to one another on said two-dimensional display image and said three-dimensionally designed display image displayed on said display unit respectively.

15. The three-dimensionally designed display radar according to claim 1, further comprising:

a marker generator, wherein:

said marker generator converts rectangular lattice-shaped distance marker signals or concentric circular distance marker signals into XY coordinate values based on said perspective projection drawing method respectively to obtain perspective projection-based lattice-shaped distance marker signals or substantially egg-shaped distance marker signals which are supplied to said display memory when said three-dimensionally designed image is displayed on a screen of said display unit so that said perspective projection-based lattice-shaped distance marker signals or said substantially egg-shaped distance marker signals are selectively superimposed on said three-dimensionally designed image data on the basis of an instruction of said operator;

said marker generator further supplies concentric circular distance marker signals to said display memory when said two-dimensional image is displayed on said screen of said display unit so that said concentric circular distance marker signals are selectively superimposed on said two-dimensional image data on the basis of an instruction of said operator; and said marker generator further generates cross-shaped markers at designated positions on said screen of said display unit on the basis of an instruction of said operator so that said cross-shaped markers are displayed at said designated positions corresponding to one another on said two-dimensional display image and said three-dimensionally designed display image displayed on said display unit respectively.

16. The three-dimensionally designed display radar according to claim 2, further comprising:

a marker generator, wherein:

said marker generator converts rectangular lattice-shaped distance marker signals or concentric circular distance marker signals into XY coordinate values based on said perspective projection drawing method respectively to obtain perspective projection-based lattice-shaped distance marker signals or substantially egg-shaped distance marker signals which are supplied to said display memory when said three-dimensionally designed image is displayed on a screen of said display unit so that said perspective projection-based lattice-shaped distance marker signals or said substantially egg-shaped distance marker signals are selectively superimposed on said three-dimensionally designed image data on the basis of an instruction of said operator;

said marker generator further supplies concentric circular distance marker signals to said display memory when said two-dimensional image is displayed on said screen of said display unit so that said concentric circular distance marker signals are selectively superimposed on said two-dimensional image data on the basis of an instruction of said operator; and said marker generator further generates cross-shaped markers at designated positions on said screen of said display unit on the basis of an instruction of said operator so that said cross-shaped markers are displayed at said designated positions corresponding to one another on said two-dimensional display image and said three-dimensionally designed display image displayed on said display unit respectively.

17. The three-dimensionally designed display radar according to claim 1, wherein said three-dimensionally designed coordinate converter applies rotation to coordinate conversion operation of said three-dimensionally designed coordinate converter on the basis of an instruction of said operator.

18. The three-dimensionally designed display radar according to claim 2, wherein said three-dimensionally designed coordinate converter applies rotation to coordinate conversion operation of said three-dimensionally designed coordinate converter on the basis of an instruction of said operator.

* * * * *

UNITED STATES PATENT AND TRADEMARK OFFICE
CERTIFICATE OF CORRECTION

PATENT NO. : 6,198,428 B1
DATED : March 6, 2001
INVENTOR(S) : Chogo Sekine

It is certified that error appears in the above-identified patent and that said Letters Patent is hereby corrected as shown below:

Title page,
Item [30], Foreign Application Priority Data, change "Jun. 11, 1919" to -- Jun. 11, 1998 --;

Column 5,
Line 8, change "SO" to -- S$\theta$ --.

Signed and Sealed this

Twenty-seventh Day of November, 2001

Attest:

NICHOLAS P. GODICI
Attesting Officer
Acting Director of the United States Patent and Trademark Office